April 29, 1930.  E. M. STORY  1,756,609
CONTAINER CHARGING ICE CREAM SCOOP
Filed June 19, 1929
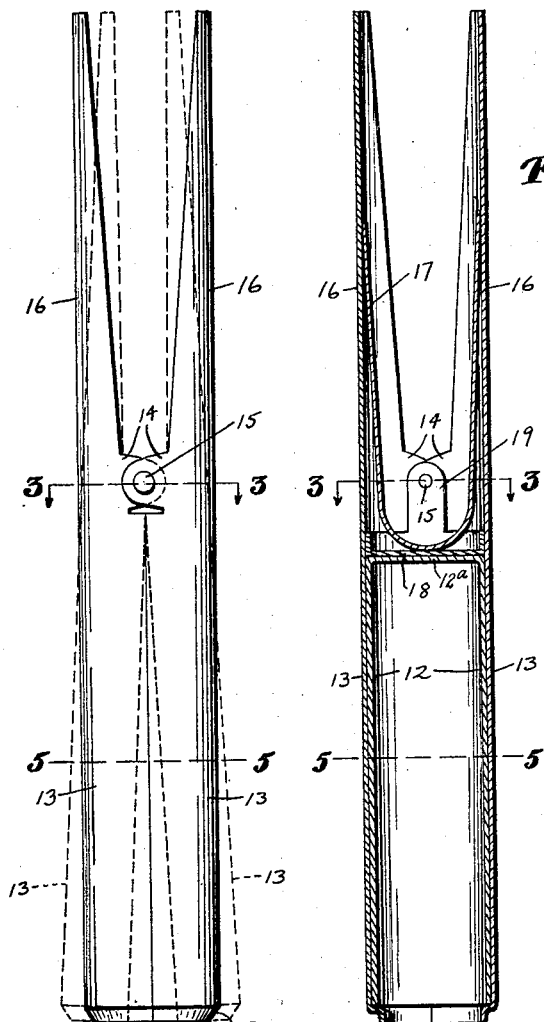
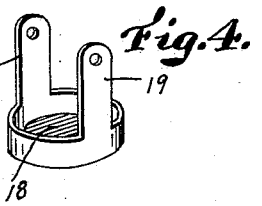
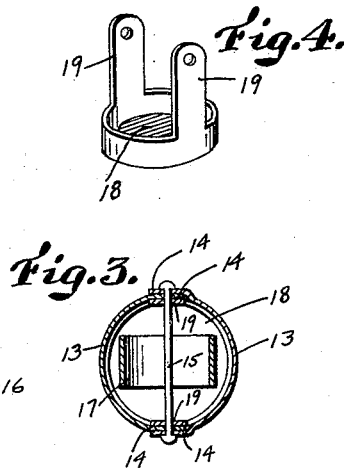
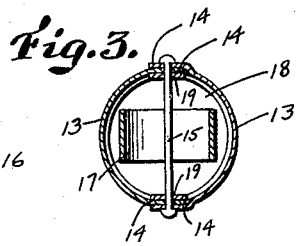
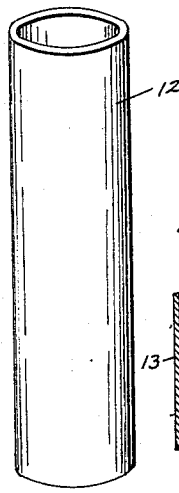
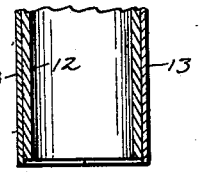
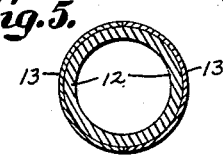
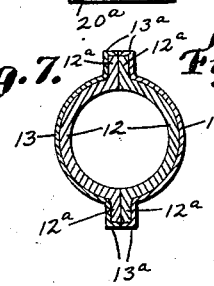
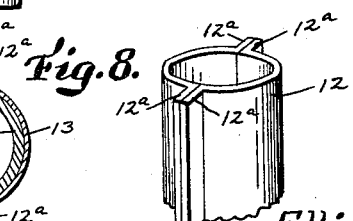
Inventor
Elliott M. Story Patented Apr. 29, 1930

1,756,609

UNITED STATES PATENT OFFICE

ELLIOTT M. STORY, OF WORCESTER, MASSACHUSETTS

CONTAINER-CHARGING ICE-CREAM SCOOP

Application filed June 19, 1929. Serial No. 372,190.

The object of this invention is to provide a scoop adapted to be forced into a mass of ice-cream and to carry with it an edible container, cause the charging of the latter with the material into which the scoop is forced, and release the charged container when removed from the mass.

The invention consists in the improved construction hereinafter described and claimed, whereby the object above stated is attained.

Of the accompanying drawings forming a part of this specification,—

Figure 1 is a side view of a scoop embodying the invention.

Figure 2 is a longitudinal section of the same.

Figure 3 is a section on line 3—3 of Figures 1 and 2.

Figure 4 is a perspective view of the head hereinafter described.

Figure 5 is a section on line 5—5 of Figures 1 and 2.

Figure 6 shows in perspective the edible container shown in section by Figures 2 and 5.

Figure 7 is a view similar to Figure 6, showing a different form of the jaws and container.

Figure 8 is a perspective view, showing a portion of the container shown by Figure 7.

Figure 9 is a view similar to a portion of Figure 2, showing a modification.

The same reference characters indicate the same parts in all of the figures.

The scoop shown by the drawings is adapted to hold an edible container 12, which is substantially tubular, although it may be adapted to hold a container otherwise formed, and not necessarily of circular form in cross section. The material of the container may be the same as that of an ordinary ice-cream cone.

The scoop comprises a pair of duplicate jaws 13, shaped to conform to and wholly receive an elongated container, a hinge connection between the jaws whereby they are adapted to be closed on the container, and opened as indicated by dotted lines in Figure 1, to release the same, said connection preferably including ears 14, formed on the jaws, and a pintle 15, engaged with said ears.

The outer ends of the jaws form a cutter adapted to penetrate a mass of ice-cream in a tub into which the jaws are forced. The jaws are provided with handles 16, extending from their inner ends, whereby the jaws may be manipulated and opened.

17 designates a spring cooperating with the handles to close the jaws. 18 designates a head secured between the inner ends of the jaws and formed to support the container against endwise movement by pressure exerted thereon by material into which the jaws are forced, the head being preferably a disk forming a partition between the jaws and adapted to close the inner end of the container. The head is preferably secured by ears 19 formed thereon and engaged with the pintle 15, as shown by Figures 2 and 3; the head being free from direct attachment to the jaws, so that the latter may be opened and closed without movement of the head.

Each jaw 13 and its handle 16, preferably constitute a single sheet metal member, the handles being integral with the jaws as shown by Figures 1 and 2.

The outer ends of the jaws 13 may be contracted so that they form a stop adapted to bear on the outer end of the container 12, when the jaws are closed and thus confine the container against outward endwise movement. Figure 1 shows beveled contracted jaw portions 20, and Figure 2 shows angular contracted portions 20$^a$. Said stop may be omitted, as shown by Figure 9.

The container may be formed in two separable sections having flanges 12$^a$, on their abutting longitudinal edges, as shown by Figures 7 and 8, the jaws being provided with hooked flanges formed to cover the outer sides and edges of said flanges, as shown by Figure 7. The sectional container, shown by Figures 7 and 8, constitutes the casing element of a so-called ice-cream sandwich, the sections bearing separably on each other.

When a container is confined between the jaws and the latter are forced into a mass of ice-cream, a charge of the material enters and fills the container. When the jaws are withdrawn from the mass and opened, the charged container is released and is ready for consumption.

The inner end of the container may be closed by a head 12ª, as shown by Figure 2, or it may be open, as shown by Figure 6, a closed end being preferred.

I claim:

1. A scoop adapted to hold an edible container and manipulate the same to charge it, comprising a pair of jaws conforming to and adapted to wholly receive an elongated container, a hinge connection between the inner ends of the jaws whereby they are adapted to be closed upon the container and opened to release the same, the outer ends of the jaws forming a cutter adapted to penetrate a mass of ice-cream into which the jaws are forced, handles extending from the inner ends of the jaws whereby the latter may be manipulated and opened, each jaw and its handle being a single sheet metal member, a spring cooperating with the handles to close the jaws, a head adapted to support the container against endwise movement by pressure exerted thereon by the material into which the jaws are forced, and head-confining means connecting the head with said hinge connection and locating the head between the inner ends of the jaws, the head being independent of the jaws, so that the latter may be opened and closed without movement of the head.

2. A scoop adapted to hold an edible container and manipulate the same to charge it, comprising a pair of jaws conforming to and adapted to wholly receive an elongated container, a hinge connection between the inner ends of the jaws whereby they are adapted to be closed upon the container and opened to release the same, the outer ends of the jaws forming a cutter adapted to penetrate a mass of ice-cream into which the jaws are forced, handles extending from the inner ends of the jaws whereby the latter may be manipulated and opened, a spring cooperating with the handles to close the jaws, and a head secured between the inner ends of the jaws and formed to support the container against endwise movement by pressure exerted thereon by the material into which the jaws are forced, each jaw and its handle being a single sheet metal member, the hinge connection including ears integral with the jaws and handles and a pintle connecting said ears, the head being a disk formed to fill the space between the inner ends of the jaws and provided with ears engaged with the pintle.

In testimony whereof I have affixed my signature.

ELLIOTT M. STORY.